United States Patent
Nishisaka

(10) Patent No.: US 9,978,518 B2
(45) Date of Patent: May 22, 2018

(54) MULTILAYER CERAMIC CAPACITOR

(71) Applicant: Murata Manufacturing Co., Ltd., Nagaokakyo-shi, Kyoto-fu (JP)

(72) Inventor: Yasuhiro Nishisaka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 111 days.

(21) Appl. No.: 15/191,990

(22) Filed: Jun. 24, 2016

(65) Prior Publication Data

US 2017/0018361 A1    Jan. 19, 2017

(30) Foreign Application Priority Data

Jul. 14, 2015  (JP) ................................ 2015-140603
May 18, 2016  (JP) ................................ 2016-099537

(51) Int. Cl.
*H01G 4/228* (2006.01)
*H01G 4/30* (2006.01)
*H01G 4/232* (2006.01)
*H01G 4/12* (2006.01)
*H01G 4/008* (2006.01)

(52) U.S. Cl.
CPC ........... *H01G 4/2325* (2013.01); *H01G 4/232* (2013.01); *H01G 4/30* (2013.01); *H01G 4/008* (2013.01); *H01G 4/12* (2013.01)

(58) Field of Classification Search
CPC ...... H01G 4/2325; H01G 4/232; H01G 4/228; H01G 4/30
See application file for complete search history.

(56) References Cited

U.S. PATENT DOCUMENTS

| | | | | |
|---|---|---|---|---|
| 2009/0296311 A1* | 12/2009 | Otsuka | ................... | H01G 2/065 361/306.3 |
| 2010/0128412 A1 | 5/2010 | Nishihara et al. | | |
| 2014/0085767 A1* | 3/2014 | Kang | ....................... | H01G 4/12 361/301.4 |
| 2014/0174800 A1* | 6/2014 | Chang | .................... | H05K 1/185 174/257 |
| 2014/0290999 A1* | 10/2014 | Park | ......................... | H01G 4/30 174/260 |
| 2015/0124370 A1* | 5/2015 | Ahn | ........................ | H01G 4/224 361/272 |

FOREIGN PATENT DOCUMENTS

JP    2010-129621 A    6/2010

* cited by examiner

*Primary Examiner* — Eric Thomas
(74) *Attorney, Agent, or Firm* — Keating & Bennett, LLP

(57) ABSTRACT

In a multilayer ceramic capacitor, each outer electrode includes a first outer electrode layer that contains Ni and that is disposed on each main surface of a multilayer body and a second outer electrode layer that contains a glass component and Cu and that covers one end portion of the first outer electrode layer which is closer to an end surface of the multilayer body, the first and second outer electrode layers are joined together in a region including an edge shared by the main surface and the end surface, the other end portion of the first outer electrode layer is exposed from the second outer electrode layer, and Ni of the first outer electrode layer is diffused in the second outer electrode layer and is dissolved in Cu of the second outer electrode layer to define a solid solution in the region including the edge.

13 Claims, 6 Drawing Sheets

MULTILAYER CERAMIC CAPACITOR

CROSS REFERENCE TO RELATED APPLICATIONS

This application claims the benefit of priority to Japanese Patent Application 2016-0099537 filed May 18, 2016 and Japanese Patent Application 2015-140603 filed Jul. 14, 2015. The entire content of each application are hereby incorporated by reference.

BACKGROUND OF THE INVENTION

1. Field of the Invention

The present invention relates to a ceramic capacitor. Specifically, the present invention relates to a multilayer ceramic capacitor that includes a multilayer body including a stack of inner electrodes and dielectric layers, and outer electrodes disposed on the surface of the multilayer body so as to be connected to the inner electrodes.

2. Description of the Related Art

In recent years, multilayer ceramic capacitors including a multilayer body constituted by a stack of inner electrodes and dielectric layers, and outer electrodes disposed on the surface of the multilayer body so as to be connected to the inner electrodes have been widely used in various applications. One example of such a multilayer ceramic capacitor is a multilayer ceramic capacitor (multilayer ceramic electronic component) disclosed in, for example, Japanese Unexamined Patent Application Publication No. 2010-129621.

As shown in FIG. 5, this multilayer ceramic capacitor (multilayer ceramic capacitor 101) includes a multilayer body (ceramic multilayer body) 105 constituted by a stack of dielectric layers (ceramic layers) 102 and inner electrodes 103 and 104 arranged with the dielectric layers 102 therebetween, and a pair of outer electrodes 112 and 113 disposed on opposite-end surfaces 108 and 109 of the multilayer body 105, respectively, so as to be in electrical communication with the inner electrodes 103 and 104, respectively.

Each of the outer electrodes 112 and 113 of the multilayer ceramic capacitor 101 is formed in the following manner. A brazing material containing Ti is applied to at least a part of the surface on which the outer electrode 112 or 113 is to be formed, which includes main faces 106 and 107 of the multilayer body 105, and the brazing material is baked, such that a metal layer 119 containing Ti is formed. Then, platings 114, 115, and 116 are formed so as to cover the metal layer 119, and an interdiffusion layer 120 is created between the metal layer 119 and the plating (Cu plating) 114 as shown in FIG. 6 (enlarged view of area B of FIG. 5).

Japanese Unexamined Patent Application Publication No. 2010-129621 states that the above-described structure makes it possible to provide a multilayer ceramic capacitor (multilayer ceramic electronic component) 101 that has outer electrodes 112 and 113 strongly bonded to the multilayer body 105 and that is highly resistant to moisture.

However, the multilayer ceramic capacitor (multilayer ceramic electronic component) 101, which has the above-described structure, has a problem in that, although the multilayer ceramic capacitor 101 has the interdiffusion layer 120 between the metal layer 119 and the plating 114, the multilayer ceramic capacitor 101 does not always have a sufficient reliability in moisture resistance, depending on the degree of interdiffusion of a Ag—Cu—Ti alloy (metal layer 119) and Cu (plating 114).

The multilayer ceramic capacitor 101 further has the following problem. Assume that one of opposite ends of the metal layer 119 in the direction in which each of the inner electrodes 103 and 104 extends to an end surface of the multilayer body 105 (i.e., the end which is closer to the end surface 108 or 109 of the multilayer body 105) is referred to as the end-face-side end and the other end of the metal layer 119 (i.e., the end which is closer to the center in the direction of the length of the multilayer body 105) is referred to as the center-side end. Since the plating 114 entirely covers the metal layer 119, when the interdiffusion of metals occurs at the center-side end of the metal layer 119, thermo-mechanical strength (flexural strength) decreases.

SUMMARY OF THE INVENTION

Accordingly, preferred embodiments of the present invention provide a highly-reliable multilayer ceramic capacitor that is highly resistant to moisture and that has a high thermo-mechanical strength.

According to a preferred embodiment of the present invention, a multilayer ceramic capacitor includes a multilayer body including a stack of inner electrodes and dielectric layers, and outer electrodes disposed on the surface of the multilayer body so as to be connected to the inner electrodes. Each of the outer electrodes includes a first outer electrode layer that contains Ni and that is disposed on each main surface of the multilayer body and a second outer electrode layer that contains a glass component and Cu, that covers an end surface, on which some of the inner electrodes are exposed, of the multilayer body so as to be in electrical communication with the some of the inner electrodes, and that covers one of opposite end portions of the first outer electrode layer in a direction in which the some of the inner electrodes extend to the end surface, the one of the opposite end portions of the first outer electrode layer being closer to the end surface of the multilayer body. The first and second outer electrode layers are joined to each other in a region that is located on the main surface of the multilayer body and that includes an edge shared by the main surface and the end surface. The other of the opposite end portions of the first outer electrode layer is not covered with and is exposed from the second outer electrode layer. Ni of the first outer electrode layer is diffused in the second outer electrode layer and is dissolved in Cu of the second outer electrode layer to define a solid solution in the region including the edge.

It is preferable that the second outer electrode layer covers about 3% or more and about 50% or less of the length of the first outer electrode layer in the direction in which the some of the inner electrodes extend to the end surface.

Since the second outer electrode layer covers about 3% or more and about 50% or less of the length of the first outer electrode layer in the direction in which each inner electrode extends to an end surface of the multilayer body, it is possible to provide a sufficient Ni—Cu solid solution layer which is necessary to ensure moisture resistance. This makes the multilayer ceramic capacitor of the present preferred embodiment effective.

It is preferable that Ni of the first outer electrode layer is diffused in the second outer electrode layer over a distance of about 10% or more and about 100% or less of the thickness of a portion of the second outer electrode layer, the portion overlying the first outer electrode layer.

Since Ni of the first outer electrode layer is diffused in the second outer electrode layer over a distance of about 10% or more and about 100% or less of the thickness of a portion (the portion overlying the first outer electrode layer) of the second outer electrode layer, it is possible to ensure the Ni diffusion distance sufficient for an improvement in moisture resistance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following more specifically describes preferred embodiments of the present invention.

Preferred Embodiment 1

Figure 1:
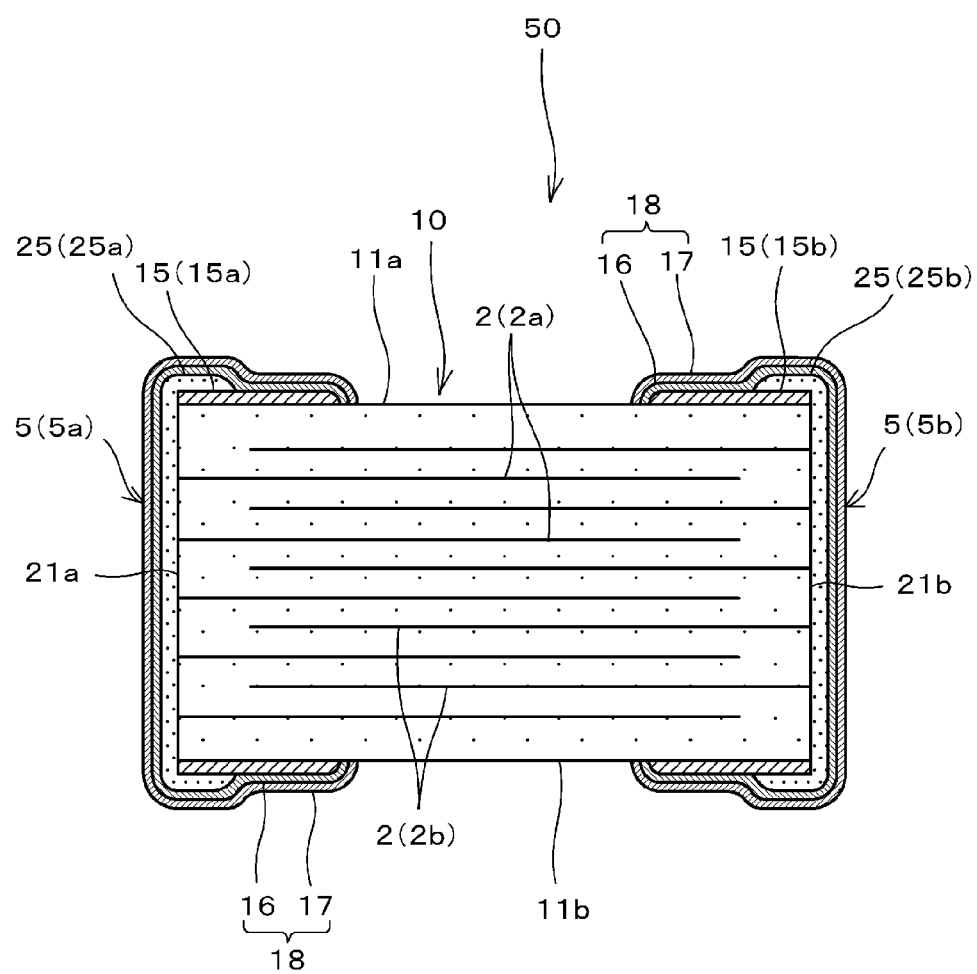
FIG. 1 is a front cross-sectional view showing a structure of a multilayer ceramic capacitor of one preferred embodiment (Preferred Embodiment 1) of the present invention.
Figure 2:
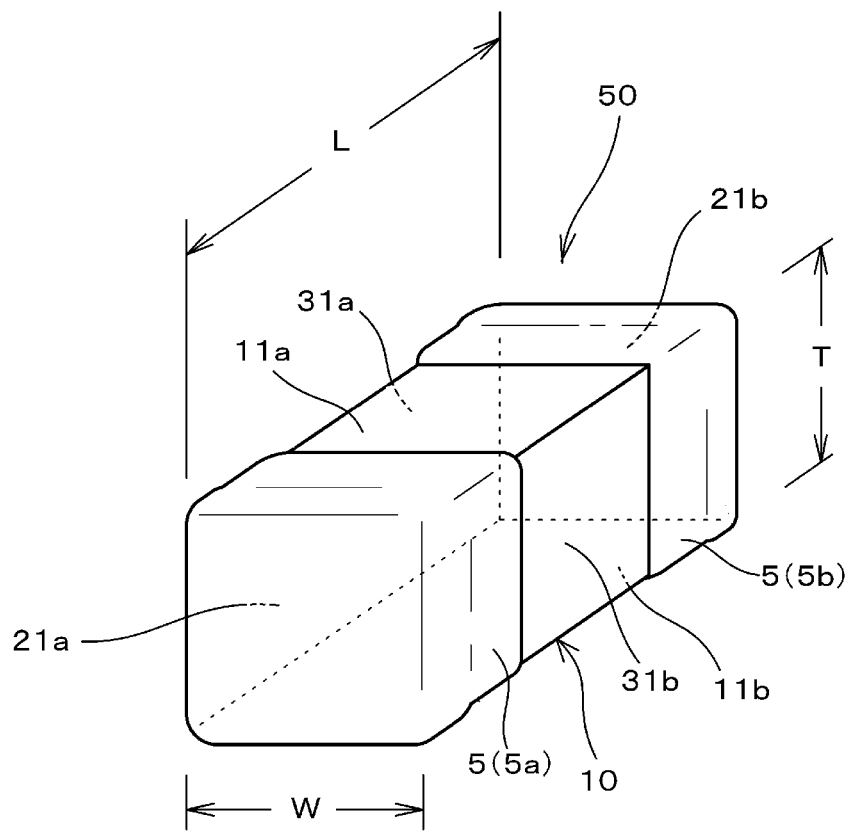
FIG. 2 is a perspective view showing the appearance of the multilayer ceramic capacitor of Preferred Embodiment 1 of the present invention.

FIG. 1 is a front cross-sectional view showing a structure of a multilayer ceramic capacitor 50 of one preferred embodiment (Preferred Embodiment 1) of the present invention, and FIG. 2 is a perspective view showing the appearance of the multilayer ceramic capacitor 50.

As shown in FIGS. 1 and 2, the multilayer ceramic capacitor 50 includes a multilayer body (ceramic base body) 10 including a stack of dielectric layers 1 made of a dielectric ceramic material and inner electrodes 2 (first and second inner electrodes 2a and 2b); and a pair of outer electrodes 5 (5a, 5b) disposed on the outer surface of the multilayer body 10 so as to be in electrical communication with the inner electrodes 2 (2a, 2b). The outer electrodes 5 (5a, 5b) each include a plating 18 on the surface thereof. Each plating 18 includes a two-layer structure including a Ni plating 16 and a Sn plating 17.

The following more specifically describes each element of the multilayer ceramic capacitor.

The multilayer body 10 is substantially in the shape of a cuboid that includes first and second main surfaces 11a and 11b opposite each other, first and second end surfaces 21a and 21b opposite each other and perpendicular or substantially perpendicular to the first main surface 11a, and first and second side surfaces 31a and 31b opposite each other and perpendicular or substantially perpendicular to the first main surface 11a.

It should be noted that the corners and edges of the multilayer body 10 are preferably rounded.

The dimensions of the multilayer body 10 are not particularly limited. Assuming that the thickness, length, and width of the multilayer body 10 are defined as T, L, and W, respectively, the multilayer body 10 may be a thin body which satisfies the relationship T<W<L, $(1/5)W \leq T \leq (1/2)W$, or T<0.3 mm, for example. Specifically, the multilayer body 10 may be a thin body which satisfies the relationships $0.05$ mm$\leq T<0.3$ mm, $0.4$ mm$\leq L\leq 1$ mm, and $0.3$ mm$\leq W\leq 0.5$ mm, for example.

It should be noted, however, that the multilayer body 10 of a preferred embodiment of the present invention is not limited to a particular shape and dimensions and may have any other shape and dimensions.

The dielectric layers 1 of the multilayer body 10 are made from a ceramic material. Examples of the ceramic material include dielectric ceramic materials containing $BaTiO_3$, $CaTiO_3$, $SrTiO_3$, $CaZrO_3$, or the like as a main component. The ceramic material may be a material obtained by adding a secondary component such as a Mn compound, a Fe compound, a Cr compound, a Co compound, or a Ni compound to the main component like one of those described above. It should be noted that a preferable thickness of each dielectric layer 1 is usually about 0.5 μm or more and about 10 μm or less, for example.

The multilayer ceramic capacitor of the present preferred embodiment is structured such that inner electrodes 2 overlapping each other with a dielectric layer 1 therebetween define an effective region in which a capacitance is generated.

The multilayer body 10 includes therein the first and second inner electrodes 2a and 2b, which are substantially in the shape of a rectangle and which are equally or substantially equally spaced in the thickness (T) direction in an alternating manner.

One end of each of the first and second inner electrodes 2a and 2b is exposed on an end surface of the multilayer body 10. Specifically, one end of each first inner electrode 2a is exposed on the first end surface 21a of the multilayer body 10, whereas one end of each second inner electrode 2b is exposed on the second end surface 21b of the multilayer body 10.

Each of the first and second inner electrodes 2a and 2b is parallel or substantially parallel to the first and second main surfaces 11a and 11b. The main portions of the first and second inner electrodes 2a and 2b overlap each other with the dielectric layers 1 therebetween in the thickness (T) direction.

The thicknesses of the first and second inner electrodes 2a and 2b are not particularly limited. Usually, the thickness of each inner electrode is preferably about 0.2 μm or more and about 2 μm or less, for example.

The first and second inner electrodes 2a and 2b may be made from any of a variety of conductive materials. Specifically, the first and second inner electrodes 2a and 2b may be made from, for example, a metal such as Ni, Cu, Ag, Pd, or Au, or an alloy containing such a metal, such as a Ag—Pd alloy.

The outer electrodes 5 (5a, 5b) on the surface of the multilayer body 10 cover the exposed portions of the first and second inner electrodes 2a and 2b exposed on the surface of the multilayer body 10. Specifically, the outer electrodes 5 (5a, 5b) are disposed so as to cover:

(a) the first and second end surfaces 21a and 21b of the multilayer body 10, respectively;

(b) opposite end portions in the L direction of each of the first and second main surfaces 11a and 11b of the multilayer body 10 (the L direction is the direction of the length of the multilayer body 10, i.e., the direction in which each of the inner electrodes 2a and 2b extends to an end surface of the multilayer body 10); and (c) opposite end portions in the L direction of each of the first and second side surfaces 31a and 31b of the multilayer body 10.

Each of the outer electrodes 5 (5a, 5b) includes a first outer electrode layer 15 (15a, 15b) and a second outer electrode layer 25 (25a, 25b). Specifically, the outer electrode 5a includes the first outer electrode layer 15a and the second outer electrode layer 25a, whereas the outer electrode 5b includes the first outer electrode layer 15b and the second outer electrode layer 25b.

The first outer electrode layer 15 (15a, 15b) contains Ni and is disposed on each of the main surfaces 11a and 11b of the multilayer body 10. It should be noted that, although the first outer electrode layer 15 (15a, 15b) of the multilayer ceramic capacitor of the present preferred embodiment is disposed on each of the main surfaces 11a and 11b of the multilayer body 10, the first outer electrode layer 15 (15a, 15b) may be disposed also on each of the side surfaces 31a and 31b of the multilayer body 10.

The second outer electrode layer 25 (25a, 25b) of each of the outer electrodes 5 contains a glass component and Cu and covers the end surface (21a, 21b) of the multilayer body 10, covers one of opposite end portions in the L direction of the first outer electrode layer 15 (15a, 15b) so as to be joined to the first outer electrode layer 15 (15a, 15b), and covers one of opposite end portions in the L direction of each of the side surfaces 31a and 31b of the multilayer body 10.

The first outer electrode layer 15 (15a, 15b) and the second outer electrode layer 25 (25a, 25b) are joined to each other in a region that is located on the main surface (11a, 11b) of the multilayer body 10 and that includes the edge shared by the main surface (11a, 11b) and the end surface (21a, 21b).

The other end portion of the first outer electrode layer 15 (15a, 15b), which is closer to the center in the L direction of the multilayer body 10 (that is, the end portion opposite the end portion closer to the end surface (21a, 21b) of the multilayer body 10), is not covered with the second outer electrode layer 25 (25a, 25b) and is exposed from the second outer electrode layer 25 (25a, 25b).

Furthermore, in the foregoing region including the edge, Ni of the first outer electrode layer 15 (15a, 15b) is diffused in the second outer electrode layer 25 (25a, 25b) and Ni of the first outer electrode layer dissolved in Cu of the second outer electrode layer 25 (25a, 25b) to form a solid solution.

The following is a description of the first outer electrode layer 15 (15a, 15b) and the second outer electrode layer 25 (25a, 25b).

The first outer electrode layer 15 (15a, 15b) contains a conductive component. The conductive component may be, for example, Ni or an alloy containing Ni.

The first outer electrode layer 15 (15a, 15b) preferably contains an inorganic binding material. The inorganic binding material serves to increase the adhesion to the multilayer body 10.

In the case where the first outer electrode layer 15 (15a, 15b) and the multilayer body 10 are formed concurrently by co-firing, the inorganic binding material is preferably the same ceramic material as that contained in the dielectric layers of the multilayer body 10 or a ceramic material having the same main component as that contained in the dielectric layers of the multilayer body 10. The amount of the inorganic binding material in the first outer electrode layer is preferably about 40 vol % or more and 60 vol % or less, for example.

The thickness (maximum thickness) of the first outer electrode layer 15 (15a, 15b) is preferably about 1 μm or more and about 20 μm or less, for example.

The first outer electrode layer 15 (15a, 15b) may be formed by co-firing of the inner electrodes and the first outer electrode layer 15 (15a, 15b).

The second outer electrode layer 25 (25a, 25b) contains a conductive component. The conductive component may be, for example, Cu or an alloy containing Cu.

The second outer electrode layer 25 (25a, 25b) preferably contains an inorganic binding material. The inorganic binding material serves to increase the adhesion to the multilayer body 10. An example of the inorganic binding material include glass components.

The amount of the inorganic binding material in the second outer electrode layer 25 (25a, 25b) is preferably about 15 vol % or more and about 35 vol % or less, for example.

The thickness (maximum thickness) of the second outer electrode layer 25 (25a, 25b) is preferably about 1 to about 20 μm, for example.

The second outer electrode layer 25 (25a, 25b) may be formed by applying a conductive paste and baking the paste.

The second outer electrode layer may be formed by, for example, applying a conductive paste to the fired multilayer body (ceramic base body) 10 and baking the paste at about 700° C. to about 900° C., for example.

Each of the outer electrodes 5 (5a, 5b) preferably has a plating thereon which covers the first outer electrode layer 15 (15a, 15b) and the second outer electrode layer 25 (25a, 25b).

As described earlier, each of the outer electrodes 5 (5a, 5b) of the multilayer ceramic capacitor of the present preferred embodiment includes the two-layer plating 18 including the Ni plating 16 and the Sn plating 17.

It should be noted that the material for the plating (plating metal) is not limited to those described above. The plating may be made from, for example, Sn, Ag, Pd, an Ag—Pd alloy, Au, and/or the like, as well as Ni and Sn.

The plating may have a two-layer structure (multilayer structure) as described above or may have a single-layer structure. The plating may have a structure of three or more layers.

In the case where the plating has a single-layer structure, the thickness of the layer is preferably about 1 μm or more and about 10 μm or less, for example. In the case where the plating has a multilayer structure, each layer of the multilayer plating preferably has a thickness of about 1 μm or more and about 10 μm or less, for example.

Furthermore, in the case where the outer electrodes 5 include the plating 18 thereon, a conductive resin layer for stress relaxation may be disposed between (i) the first outer electrode layer 15 (15a, 15b) and the second outer electrode layer 25 (25a, 25b) and (ii) the plating 18.

The following is a description of a non-limiting example of a method for producing the multilayer ceramic capacitor of the present preferred embodiment.

Ceramic green sheets for the dielectric layers, a conductive paste for the inner electrodes, a conductive paste (containing Ni) for the first outer electrode layer, and a conductive paste (containing Cu) for the second outer electrode layer are prepared.

The ceramic green sheets and conductive pastes contain a binder and a solvent. There is no particular limitation on the binder and the solvent and any known organic binder and organic solvent may be used.

The conductive paste for the inner electrodes is applied to the ceramic green sheets by printing such as screen printing, gravure printing, or the like to form predetermined patterns, such that inner electrode patterns are formed.

A predetermined number of ceramic green sheets having no inner electrode patterns thereon, which are for an outer layer, are stacked together to form a stack. On this stack, the ceramic green sheets having the inner electrode patterns thereon are stacked together. On the stack thus formed, another predetermined number of ceramic green sheets having no inner electrode patterns thereon, which are for an outer layer, are stacked. In this way, a mother multilayer body is prepared.

The conductive paste (containing Ni) for the first outer electrode layer is applied by printing such as screen printing to the top and bottom main surfaces of the mother multilayer body, thus forming outer electrode patterns which will become the first outer electrode layers of the outer electrodes.

The mother multilayer body is cut along predetermined lines into green (unfired) multilayer bodies of a predetermined size. It should be noted here that the multilayer bodies may be subjected to barrel finishing or the like so that the edges and corners are rounded.

Next, the unfired multilayer bodies are fired. A preferable firing temperature is, although it depends on the types of the ceramic material and conductive materials, usually about 900° C. or higher and about 1300° C. or lower, for example. In this way, the ceramic green sheets, the conductive paste for the inner electrodes, and the conductive paste for the first outer electrode layer are fired concurrently, such that sintered multilayer bodies (ceramic base bodies) including the first outer electrode layer thereon are obtained.

The conductive paste (containing Cu) for the second outer electrode layer is applied to the opposite-end surfaces of each fired multilayer body by, for example, a dipping method, and baked. In this way, the second outer electrode layer is formed on each end surface of the multilayer body.

Then, an underlying plating (e.g., Ni plating) is formed so as to cover the first and second outer electrode layers by a plating process. The plating may either be electrolytic plating or non-electrolytic plating. It should be noted however that, in the case of non-electrolytic plating, the process tends to become complex because a pre-treatment using a catalyst or the like is necessary to improve plating deposition rate. Therefore, usually electrolytic plating is preferable. Furthermore, the plating method is preferably a barrel plating method.

Then, one or more top platings (e.g., Sn plating) are formed on the underlying plating, if necessary.

In this way, a multilayer ceramic capacitor according to a preferred embodiment of the present invention may be produced with certainty. It should be noted, however, that there is no particular limitation on the method for producing a multilayer ceramic capacitor of a preferred embodiment of the present invention and any known method may be used to produce a multilayer ceramic capacitor.

A multilayer ceramic capacitor (sample of Example 1) produced by the foregoing method and having the features of a preferred embodiment of the present invention was subjected to a humidity loading test and IR failure rate was determined.

It should be noted that the structure (conditions) of the multilayer ceramic capacitor subjected to the evaluation and the evaluation method are as follows. Further note that the size and the like of each portion of the multilayer ceramic capacitor mentioned here are those of a multilayer ceramic capacitor including a fired multilayer body and outer electrodes.

Conditions of Sample Multilayer Ceramic Capacitor Subjected to Evaluation
  Element thickness (thickness of a portion of a dielectric layer which is sandwiched between a pair of inner electrodes): about 1.2 μm
  Ceramic material for dielectric layers: $BaTiO_3$
  Number of dielectric layers: 23
  Thickness of each outer ceramic layer (outer layer) positioned outside the outermost inner electrode: about 30 μm (about 1.2 μm×25 layers)
  Capacitance: about 0.1 μF
  Rated voltage: about 6.3 V
  Dimensions: about 1.0 mm in length, 0.5 mm in width, and 0.15 mm in thickness
  Thickness of first outer electrode layer: about 5 μm (thickness at main surface of multilayer body)
  Thickness of second outer electrode layer: about 15 μm (thickness at end surface of multilayer body)
  Thickness of underlying plating (Ni plating): about 3 μm
  Thickness of top plating (Sn plating): about 3 μm
  Temperature for firing multilayer body: about 1200° C., kept for about 2 hours Samples for Comparison
  Multilayer ceramic capacitors (samples) of Comparative Examples 1 to 3, which do not have the features of various preferred embodiments of the present invention, were prepared in the same manner as the foregoing multilayer ceramic capacitor (sample of Example 1), which has the features of various preferred embodiments of the present invention, except that different metals were used to make the first and second outer electrode layers. These samples of Comparative Examples 1 to 3 were subjected to the humidity loading test and the IR failure rate was determined in the same manner as the foregoing multilayer ceramic capacitor having the features of preferred embodiments of the present invention.

The humidity loading test was performed under the conditions of about 125° C., 95% RH, and 3.2 V for about 72 hours. After the test, insulation resistance at room temperature was measured and, if the insulation resistance was about 1 MΩ or smaller, the sample was determined as defective.

It should be noted that, in the humidity loading test, the number of samples was 20 (n=20) and the IR failure rate was calculated from the number of tested samples and the number of defective samples.

Furthermore, the identification of metal materials (Ni and Cu) constituting the first and second outer electrode layers of the sample of Example 1 and the samples of Comparative Examples 1 to 3 and the analysis of alloying state (e.g., isomorphous) were performed under the following conditions with a FE-WDX.

FE-WDX (name: JXA-8500F available from JEOL Ltd.)
  Accelerating voltage: about 15.0 kV
  Emission current: about $5×10^{-8}$ A
Conditions of Qualitative Analysis
  Beam diameter: about 0 μm
  Dwell time: about 200 ms Qualitative analysis of selected metals was performed with the FE-WDX.

It should be noted that the alloying state of metals was determined with reference to the alloy phase diagrams shown in "Metals Handbook (*Kinzoku Binran*)" (published by The Japan Institute of Metals and Materials).

Table 1 shows the results of the analysis of alloying state, IR failure rates, and overall evaluations of the sample of Example 1 and the samples of Comparative Examples 1 to 3, which were obtained as described above.

TABLE 1

|  | Example 1 | Comparative Example 1 | Comparative Example 2 | Comparative Example 3 |
|---|---|---|---|---|
| first outer electrode layer | Ni | Ag | Ti | Cu |
| second outer electrode layer | Cu | Cu | Cu | Cu |
| alloying state | isomorphous | eutectic | metal-metal compound forms | metals of the same type |
| IR failure rate | 0% | 30% | 25% | 10% |
| evaluation | good | poor | poor | poor |

As shown in Table 1, it was discovered that, in the sample of Example 1 of various preferred embodiments of the present invention, in which the first outer electrode layer contains Ni and the second outer electrode layer contains Cu, the alloying state was isomorphous state and there was no IR failure.

On the other hand, it was discovered that, in the sample of Comparative Example 1, in which the first outer electrode layer contains Ag and the second outer electrode layer contains Cu, the alloying state was eutectic state and the IR failure rate was as high as about 30%.

Furthermore, it was discovered that, in the sample of Comparative Example 2, in which the first outer electrode layer contains Ti and the second outer electrode layer contains Cu, a metal-metal compound formed at and near the interface between the first and second outer electrode layers and the IR failure rate was as high as about 25%.

Furthermore, it was discovered that, in the sample of Comparative Example 3, in which both the first and second outer electrode layers contain Cu, the same metals were joined together at the interface between the first and second outer electrode layers and thus no alloy was formed at or near the interface between the first and second outer electrode layers, and the IR failure rate was as high as about 10%.

These results demonstrated the following. In the case where the first outer electrode layer contains Ni and the second outer electrode layer contains Cu like a preferred embodiment of the present invention, Ni of the first outer electrode layer diffuses into the second outer electrode layer and is dissolved in Cu to form a solid solution, and this forms an isomorphous diffusion layer (alloy layer) in a portion of the second outer electrode layer which overlies the first outer electrode layer. This contributes to an improvement in moisture resistance.

Furthermore, the multilayer ceramic capacitor of Example 1 of a preferred embodiment of the present invention is structured such that, as shown in FIG. 1, the end portion, which is closer to the center in the L direction of the multilayer body 10, of the first outer electrode layer 15 (15a, 15b) (i.e., the end portion opposite the end portion closer to the end surface (21a, 21b) of the multilayer body 10) is exposed from the second outer electrode layer 25 (25a, 25b).

Therefore, the exposed portion of the first outer electrode layer does not experience stress resulting from the diffusion of metal. This significantly reduces or prevents the reduction of thermo-mechanical strength (flexure strength).

As is clear from this, a multilayer ceramic capacitor that has the features of various preferred embodiments of the present invention is highly reliable, is highly moisture resistant, and has a high thermo-mechanical strength.

Preferred Embodiment 2

Figure 3:
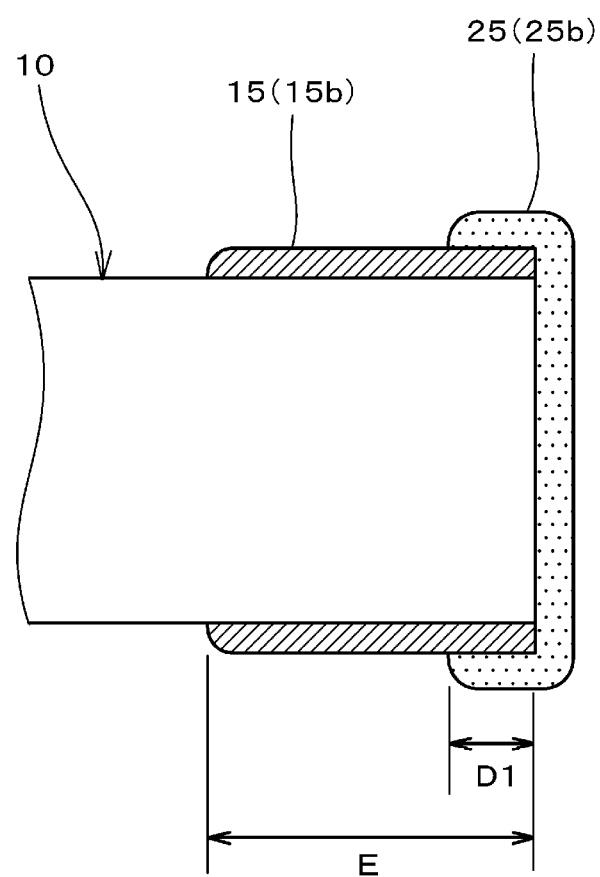
FIG. 3 is a cross-sectional view schematically showing a portion of a multilayer ceramic capacitor of another preferred embodiment (Preferred Embodiment 2) of the present invention and shows the shapes of first and second outer electrode layers and the lengths of some portions of the first and second outer electrode layers.

In the present preferred embodiment, samples of Examples 2-1, 2-2, 2-3, 2-4 and 2-5 and samples of Comparative Examples 4 and 5 were prepared. In each of these samples, the length D1 (see FIG. 3) in the L direction of a portion of the second outer electrode layer 25 (25a, 25b) which overlies the first outer electrode layer 15 (15a, 15b) is as shown in Table 2. The length in the L direction of the first outer electrode layer 15 (15a, 15b) is defined as E (see FIG. 3).

These samples were subjected to the humidity loading test and the IR failure rate was determined. The humidity loading test was performed in the same manner under the same conditions as in Preferred Embodiment 1.

In addition, a thermal shock cycling test was performed in the following manner and cracking rate of Examples and Comparative Examples was determined.

Before the thermal shock cycling test, first, each sample was soldered to a board under the following conditions.

Evaluation board: FR-4 four-layer board in about 0.8 mm thickness

Thickness of solder: about 100 μm

Reflow temperature: about 255° C.

Next, each of the above-described samples was held at about −55° C. and 80° C. for about 30 minutes each and this cycle was repeated 200 times.

Next, a surface (L-T surface) defined by the length (L) and the thickness (T) of each sample was polished to substantially the middle in the width (W) direction of the sample and the exposed, a polished surface was checked for cracks. The number of samples which had a crack was counted and cracking rate was determined. The total number of samples was 10 (n=10).

It should be noted that the following lengths:

(a) the length E in the L direction of the first outer electrode layer; and (b) the length D1 in the L direction of the portion of the second outer electrode layer which overlies the first outer electrode layer, of each sample (multilayer ceramic capacitor) were measured in the following manner.

First, a surface (L-T surface) defined by the length (L) and the thickness (T) of each sample (multilayer ceramic capacitor) (n=5) was polished to substantially the middle in the width (W) direction of the sample.

The first outer electrode layer 15 at the polished surface was observed with a SEM at a magnification of 3000×, and the distance from one end to the other end of the first outer electrode layer 15 was measured. The one end is closer to an end surface of the multilayer body 10, and the other end is closer to the center in the L direction of the multilayer body 10. The mean of the measured distances (n=5) was used as the length E of the first outer electrode layer 15.

Similarly, the second outer electrode layer 25 at the polished surface was observed with a SEM at a magnification of 3000×, and the length in the L direction of the portion of the second outer electrode layer 25 which overlies the first outer electrode layer 15 in the thickness (T) direction was measured. That is, the distance from one end of the portion which is closer to the end surface (21a, 21b) of the multilayer body 10 to the other end of the portion which is closer to the center in the L direction of the multilayer body 10 was measured. The mean of the measured distances (n=5) was used as the length D1.

Table 2 shows the values of E and D1, value of D1/E, IR failure rate obtained in the humidity loading test, and cracking rate obtained in the thermal shock cycling test, which were obtained as described above.

TABLE 2

|  | Comparative Example 4 | Example 2-1 | Example 2-2 | Example 2-3 | Example 2-4 | Example 2-5 | Comparative Example 5 |
|---|---|---|---|---|---|---|---|
| length E of electrode layer | 200 μm | 200 μm | 200 μm | 200 μm | 200 μm | 200 μm | 200 μm |
| length D1 of electrode layer | 0 μm | 6 μm | 50 μm | 100 μm | 30 μm | 90 μm | 200 μm |
| D1/E | 0% | 3% | 25% | 50% | 15% | 45% | 100% |
| IR failure rate | 10% evaluation: poor | 0% evaluation: good | 0% evaluation: good | 0% evaluation: good | 0% evaluation: good | 0% evaluation: good | 0% evaluation: good |
| cracking rate | 0% evaluation: good | 0% evaluation: good | 0% evaluation: good | 0% evaluation: good | 0% evaluation: good | 0% evaluation: good | 30% evaluation: poor |

As shown in Table 2, it was discovered that, in the samples of Examples 2-1, 2-2, and 2-3, in which the length D1 (the length in the direction in which each inner electrode extends to an end surface of the multilayer body) of the portion of the second outer electrode layer which overlies the first outer electrode layer is about 3% or more and about 50% or less of the length E (the length in the direction in which each inner electrode extends to an end surface of the multilayer body) of the first outer electrode layer (that is, D1/E is about 3% or more and about 50% or less), the IR failure rate and cracking rate were both about 0%.

In the sample of Example 2-4 (D1/E is about 15%), Example 2-5 (D1/E is about 45%), the IR failure rate and cracking rate were both about 0%.

On the other hand, it was discovered that, in the sample of Comparative Example 4, in which D1/E is about 0% (that is, the sample which does not have the following basic feature of various preferred embodiments of the present invention: one end portion of the first outer electrode layer which is closer to an end surface of the multilayer body is covered with the second outer electrode layer), the cracking rate in the thermal shock cycling test was about 0% but the IR failure rate in the humidity loading test was about 10%, which was not preferable.

Furthermore, it was discovered that, in the sample of Comparative Example 5, in which D1/E is about 100% (that is, the sample which does not have the following basic feature of various preferred embodiments of the present invention: the other end portion of the first outer electrode layer opposite the end portion closer to the end surface of the multilayer body is not covered with and is exposed from the second outer electrode layer), the IR failure rate in the humidity loading test was about 0% but the cracking rate in the thermal shock cycling test was about 30%, which was not preferable.

The results of Preferred Embodiment 2 demonstrated that D1/E is preferably about 3% or more and about 50% or less.

Specifically, the results demonstrated that undesirable IR failure occurs in the humidity loading test in Comparative Example 4, in which the second outer electrode layer never overlies the first outer electrode layer, and that undesirable cracking occurs in the thermal shock cycling test in Comparative Example 5, in which the second outer electrode layer entirely covers the first outer electrode layer (the first outer electrode layer is not exposed even partially).

Preferred Embodiment 3

Samples of Examples 3-1, 3-2, 3-3, and 3-4 and a sample of Comparative Example 6, in which the diffusion distance D2 differs from sample to sample, were prepared in the same manner as in Preferred Embodiment 1. The diffusion distance D2 is a distance over which Ni of the first outer electrode layer is diffused in a portion of the Cu-containing second outer electrode layer which overlies the first outer electrode layer (see FIGS. 4A and 4B).

The diffusion distance D2, over which Ni of the first outer electrode layer is diffused in the second outer electrode layer containing Cu, was changed by changing the baking temperature of the second outer electrode layer within the range of about 300° C. to about 700° C., for example.

Figure 4A:
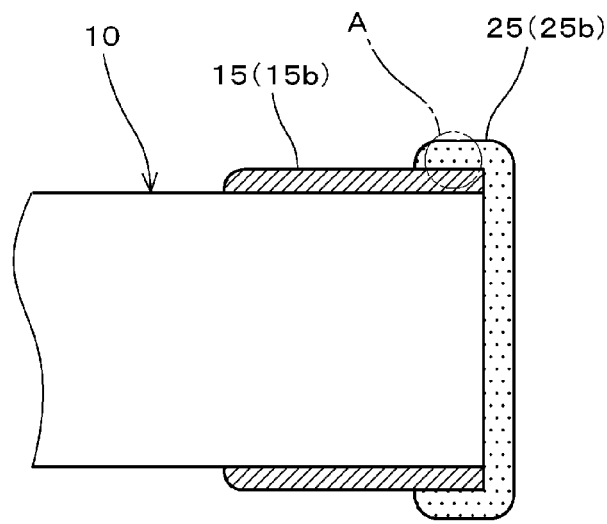
FIG. 4A is a cross-sectional view schematically showing structures of first and second outer electrode layers of a multilayer ceramic capacitor of a further preferred embodiment (Preferred Embodiment 3) of the present invention.
Figure 4B:
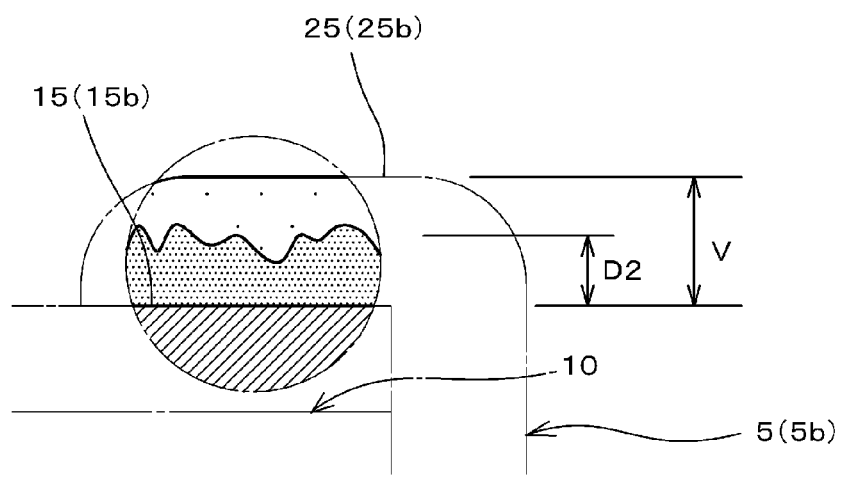
FIG. 4B is an enlarged view of area A of FIG. 4A and shows the diffusion distance D2 over which Ni of the first outer electrode layer is diffused in the second outer electrode layer containing Cu and the thickness V of the second outer electrode layer.
Figure 5:
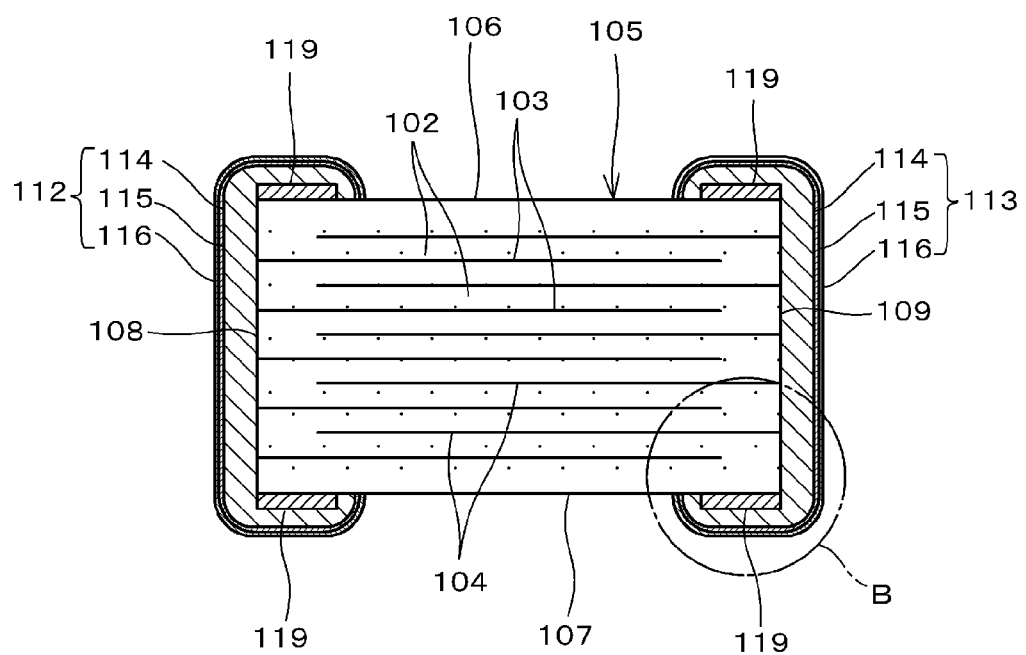
FIG. 5 is a front cross-sectional view showing a structure of a known multilayer ceramic capacitor.
Figure 6:
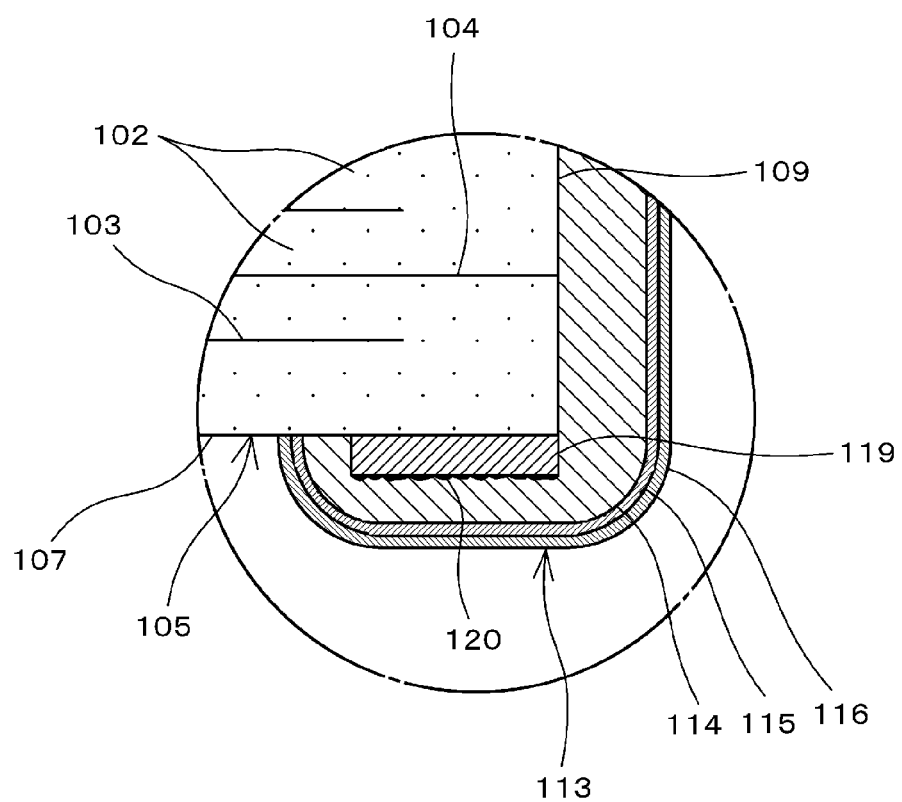
FIG. 6 is an enlarged view of area B of the multilayer ceramic capacitor of FIG. 5.

FIG. 4A is a cross-sectional view schematically showing structures of the first and second outer electrode layers 15 and 25 of a multilayer ceramic capacitor of Preferred Embodiment 3, and FIG. 4B is an enlarged view of area A of FIG. 4A and shows the diffusion distance D2 over which Ni of the first outer electrode layer is diffused in the second outer electrode layer containing Cu and the thickness V of the second outer electrode layer 25.

The samples of Examples and Comparative Example thus prepared were subjected to the humidity loading test and the IR failure rate was determined. The humidity loading test was performed in the same manner under the same conditions as in Preferred Embodiment 1 and the number of samples was 20.

It should be noted that the thickness V of a wrap-around portion (the portion wrapping around the first outer electrode layer disposed on each main surface of the multilayer body) of the second outer electrode layer, that is, the thickness V of the portion which overlies the first outer electrode layer, and the diffusion distance D2, over which Ni of the first outer electrode layer is diffused in the portion of the Cu-containing second outer electrode layer which overlies the first outer electrode layer, were determined by performing mapping analysis with the use of a spectrometer with the following features and characteristics.

FE-WDX (name: JXA-8500F available from JEOL Ltd.)
Accelerating voltage: about 15.0 kV
Emission current: about $5 \times 10^{-8}$ A
Depth of analysis: about 1 to 2 μm
Detectable elements: B to U <mapping analysis>
Number of pixels: about 256×256

Pixel size: about 0.1303 (3000×)
Dwell time (per pixel): about 40 ms
Scanning method: beam Table 3 shows the thickness V of the portion of the second outer electrode layer which overlies the first outer electrode layer, the diffusion distance D2 of Ni into Cu, D2/V, and IR failure rate in the humidity loading test.

TABLE 3

|  | Comparative Example 6 | Example 3-1 | Example 3-2 | Example 3-3 | Example 3-4 |
|---|---|---|---|---|---|
| baking temperature | 300° C. | 400° C. | 500° C. | 600° C. | 700° C. |
| thickness V of wrap-around portion of electrode layer | 5 μm | 5 μm | 5 μm | 5 μm | 5 μm |
| diffusion distance D2 | 0 μm | 0.5 μm | 3 μm | 4 μm | 5 μm |
| D2/V | 0% | 10% | 60% | 80% | 100% |
| IR failure rate | 10% evaluation: poor | 0% evaluation: good | 0% evaluation: good | 0% evaluation: good | 0% evaluation: good |

As shown in Table 3, it was discovered that, in the samples of Examples 3-1, 3-2, 3-3, and 3-4, in which the percentage (D2/V) of the diffusion distance D2 of Ni relative to the thickness V of the portion of the second outer electrode layer which overlies the first outer electrode layer is about 10% or more and about 100% or less, the IR failure rate was about 0%.

On the other hand, it was discovered that, in the sample of Comparative Example 6, in which D2/V is about 0% (i.e., the sample which does not have the following basic feature of a preferred embodiment of the present invention: Ni is diffused in the second outer electrode layer), the IR failure rate in the humidity loading test was about 10%, which was not preferable.

As has been described, a multilayer ceramic capacitor of a preferred embodiment of the present invention is structured such that:

(a) each outer electrode includes (i) a first outer electrode layer that contains Ni and that is disposed on each main surface of a multilayer body and (ii) a second outer electrode layer that contains a glass component and Cu, that covers an end surface, on which some inner electrodes are exposed, of the multilayer body so as to be in electrical communication with the inner electrodes, and that covers one of opposite end portions of the first outer electrode layer in the direction in which each inner electrode extends to the end surface of the multilayer body, the one of the opposite end portions of the first outer electrode layer being closer to the end surface of the multilayer body;

(b) the first and second outer electrode layers are joined to each other in a region that lies on the main surface of the multilayer body and that includes an edge shared by the main surface and the end surface;

(c) the other of the opposite end portions of the first outer electrode layer is not covered with and is exposed from the second outer electrode layer; and (d) Ni of the first outer electrode layer is diffused in the second outer electrode layer and is dissolved in Cu of the second outer electrode layer to define a solid solution in the region including the edge.

This makes it possible to provide a highly-reliable multilayer ceramic capacitor that is highly moisture resistant and that has a high thermo-mechanical strength.

That is, since Ni of the first outer electrode layer is diffused in the second outer electrode layer and dissolved in Cu of the second outer electrode layer to define a solid solution in the region including the edge, the reliability in moisture resistance of the multilayer ceramic capacitor improves.

Furthermore, since the other end portion of the first outer electrode layer opposite the end portion closer to the end surface of the multilayer body is not covered with and is exposed from the second outer electrode layer, the effects of stress resulting from the diffusion and dissolution of Ni of the first outer electrode layer into the second outer electrode layer are reduced. This improves the thermo-mechanical strength.

Furthermore, since the second outer electrode layer contains a glass component, the adhesion between the second outer electrode layer and the multilayer body improves. This also contributes to an improvement in reliability in moisture resistance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a stack of inner electrodes and dielectric layers; and
   outer electrodes disposed on a surface of the multilayer body so as to be connected to the inner electrodes; wherein
   each of the outer electrodes includes a first outer electrode layer that contains Ni and that is disposed on each main surface of the multilayer body and a second outer electrode layer that contains a glass component and Cu, that covers an end surface, on which some of the inner electrodes are exposed, of the multilayer body so as to be in electrical communication with the some of the inner electrodes, and that covers one of opposite end portions of the first outer electrode layer in a direction in which the some of the inner electrodes extend to the end surface, the one of the opposite end portions of the first outer electrode layer being closer to the end surface of the multilayer body;
   the first and second outer electrode layers are joined to each other in a region that is located on the main surface of the multilayer body and that includes an edge shared by the main surface and the end surface;
   the other of the opposite end portions of the first outer electrode layer is not covered with and is exposed from the second outer electrode layer; and
   Ni of the first outer electrode layer is diffused in the second outer electrode layer and is dissolved in Cu of the second outer electrode layer to define a solid solution in the region including the edge.

2. The multilayer ceramic capacitor according to claim 1, wherein the second outer electrode layer covers about 3% or more and about 50% or less of a length of the first outer electrode layer in the direction in which the some of the inner electrodes extend to the end surface.

3. The multilayer ceramic capacitor according to claim 1, wherein Ni of the first outer electrode layer is diffused in the second outer electrode layer over a distance of about 10% or more and about 100% or less of a thickness of a portion of the second outer electrode layer that overlies the first outer electrode layer.

4. The multilayer ceramic capacitor according to claim 1, wherein each of the outer electrodes includes a plating on a surface thereon.

5. The multilayer ceramic capacitor according to claim 4, wherein the plating includes a two-layer structure including a Ni plating and a Sn plating.

6. The multilayer ceramic capacitor according to claim 4, wherein the plating includes at least one selected from the group consisting of Sn, Ag, Pd, an Ag—Pd alloy, Au, Ni and Sn.

7. The multilayer ceramic capacitor according to claim 4, wherein the plating has a single-layer structure.

8. The multilayer ceramic capacitor according to claim 4, further comprising a conductive resin layer between the plating and the first and second outer electrode layers.

9. The multilayer ceramic capacitor according to claim 1, wherein the multilayer body is cuboid-shaped or substantially cuboid-shaped.

10. The multilayer ceramic capacitor according to claim 1, wherein the first outer electrode includes an inorganic binding material.

11. The multilayer ceramic capacitor according to claim 10, wherein the inorganic binding material is a same material included in the dielectric layers of the multilayer body.

12. The multilayer ceramic capacitor according to claim 1, wherein the second outer electrode includes an inorganic binding material.

13. The multilayer ceramic capacitor according to claim 12, wherein the inorganic binding material includes glass components.

* * * * *